United States Patent Office 3,480,681
Patented Nov. 25, 1969

3,480,681
PROCESS FOR THE PREPARATION AND PURIFICATION OF P-NITROBENZENES
Dominic A. Zanella, Lock Haven, Pa., assignor to American Aniline Products, Inc., a corporation of Delaware
No Drawing. Filed Mar. 18, 1968, Ser. No. 714,059
Int. Cl. C07c 79/12
U.S. Cl. 260—646      7 Claims

ABSTRACT OF THE DISCLOSURE

Pure 1, 2-dichloro-4-nitrobenzene is separated from an isomeric mixture of 1,2-dichloro-4-nitrobenzene and 1,2-dichloro-3-nitrobenzene dissolved in concentrated sulfuric acid by a fractional crystallization process. According to the invention, sufficient water is added to the concentrated sulfuric acid solution to form an ultimate concentration of 65–90% by weight of sulfuric acid whereby 1,2-dichloro-4-nitrobenzene selectively crystallizes from the concentrated acid solution to the exclusion of the 1,2-dichloro-3-nitrobenzene isomer.

BACKGROUND OF THE INVENTION

Nitro-dihalobenzenes are, in general, valuable chemical intermediates in the production of dyes, pharmaceuticals, and anti-oxidants for rubber, gasoline, and the like. In many cases, products prepared from the nitro-dihalobenzene isomer having a nitro group para to a halogen atom are much more valuable than those prepared from other nitration isomers. For example, ortho-chloro-para-nitroaniline, a derivative of 1,2-dichloro-4-nitrobenzene, is a much more valuable diazo component useful in the preparation of monazo dyestuffs than is ortho-chloro-meta-nitroaniline, a derivative of 1,2-dichloro-3-nitrobenzene.

The nitro-dichlorobenzene isomers mentioned above are formed by the nitration of ortho-dichlorobenzene in solution in sulfuric acid. The products of the nitration are primarily the 3- and 4-positional nitro isomers, with the 4-positional isomer being preferred. The isomers are only very difficultly separable.

Heretofore, the separation has been via expensive fractional distillations under vacuum, or by further reacting the nitration isomer mixture with, for example, ammonia to form a mixture of 2-nitro-6-chloroaniline, and 2-chloro-4-nitroaniline. These aniline isomers may then be separated by crystallization from sulfuric acid since the 2-nitro-6-chloroaniline is soluble in that acid, while the 2-chloro-4-nitroaniline crystallizes from the acid as the sulfate. Heretofore, then, there has been no inexpensive, direct means to separate the positional mono-nitro isomers prepared from 1,2-dichlorobenzene.

There exists, therefore, a need in the art for an economical, efficient process for the preparation of pure 1,2-dichloro-4-nitrobenzene from an isomeric mixture of nitro-dichlorobenzenes prepared by the nitration of ortho-dichlorobenzene. It is an object of this invention to provide a process for the preparation of pure 1,2-dichloro-4-nitrobenzene by a simple, economical, efficient method.

More specifically, an object of this invention is to provide a process for the separation of a mixture of nitration isomers formed in the nitration of ortho-dichlorobenzene dissolved in sulfuric acid by a novel fractional crystallization process in which a critical quantity of water is added to the nitration mass containing the isomers dissolved therein whereby 1,2-dichloro-4-nitrobenzene selectively crystallizes from the solution to the exclusion of 1,2-dichloro-3-nitrobenzene.

SUMMARY OF THE INVENTION

According to the invention, ortho-dichlorobenzene is dissolved in sulfuric acid and nitrated by adding to the solution a mixed nitrating acid comprising a mixture of nitric acid and sulfuric acid over a period of about 1–3 hours. Subsequent to the nitration, sufficient water is added to the nitration mass to dilute the sulfuric acid concentration of the mass to 65–90% by weight, thereby causing 1,2-dichloro-4-nitrobenzene to selectively, fractionally crystallize from the nitration mass. The crystals are then recovered by conventional means such as filtering or centrifuging the reaction mass.

DETAILED DESCRIPTION

In accordance with the invention, ortho-dichlorobenzene is first nitrated to yield a nitration mass containing a mixture of nitration isomers. In carrying out the nitration, ortho-dichlorobenzene is first dissolved in 1–3 parts by weight of sulfuric acid having a concentration of greater than about 70%, preferably greater than about 80% by weight. To the solution of ortho-dichlorobenzene in concentrated sulfuric acid is added at a temperature below about 35° C. (for safety purposes) at least a stoichiometric quantity, based on mono-nitration of dichlorobenzene, of a nitrating acid comprising a mixture of nitric acid in concentrated sulfuric acid. The preferred mixed acids which may be used in the process of the invention are mixtures of sulfuric acid and nitric acid of which nitric acid comprises about 25–45% by weight, preferably 35–40% by weight, the balance being sulfuric acid. The acid contains essentially no water, and will allow all its nitric acid to be consumed in the nitration reaction.

The nitration reaction proceeds readily and is complete in a period of about 1–3 hours. The temperature is maintained during the reaction below about 35° C. to minimize the danger inherent in a nitration process and also to minimize any possibility of di-nitration in the mixture.

After the nitration reaction is complete, the novel, fractional crystallization technique of the invention is employed. Accordingly, a quantity of water is added to the solution of nitrated dichlorobenzene sufficient to bring the sulfuric acid concentration in the mixture to about 65–90% by weight (excluding the weight of the nitration isomers). In determining the ultimate concentration of sulfuric acid, it should be remembered that the nitration of one mole of ortho-dichlorobenzene with nitric acid yields, in addition to the nitrated dichlorobenzene, one mole of water. For this reason, it is also critical that the initial concentration and amount of the sulfuric acid in which the ortho-dichlorobenzene is dissolved is sufficient such that the water formed during the nitration reaction does not reduce the concentration of sulfuric acid below about 65%.

The concentration to which the nitration mass is diluted is extremely critical in order to affect the novel fractional crystallization process of this invention. At concentrations of greater than about 95%, substantially no crystallization takes place. Throughout the critical range of about 65–90%, the 1,2-dichloro-4-nitrobenzene surprisingly, fractionally crystallizes from the nitration mixture to the exclusion of the 1,2-dichloro-3-nitrobenzene isomer which is also present in the mixture. At concentrations below about 65%, a low melting eutectic mixture of the 2 isomers crystallizes from solution, and it is, therefore, critical that the sulfuric acid concentration in the nitration mass never go below about 65% either during nitration (as a result of water formed during the reaction) or upon dilution of the nitration mass subsequent to the nitration reaction.

The temperature at which the fractional crystallization takes place is not extremely critical; but, due to the hazards inherent in handling hot sulfuric acid, it is preferred that the crystallization take place below about 50° C.

After sufficient water has been added to reduce the sulfuric acid concentration to the desired level, the reaction mixture is stirred for a period of time to allow the 1,2-dichloro-4-nitrobenzene to precipitate from solution and to allow the precipitating crystals to grow to a particle size which is conveniently recovered from the mother liquor. This time period is not especially critical and usually a period of a few hours is sufficient. The crystals are then recovered from the liquor by filtrating or centrifuging and the recovered product is washed with sulfuric acid having a concentration of 65–90% by weight. After washing, the filter cake is reslurried in water, filtered, and washed acid-free with cold water to yield pure 1,2-dichloro-4-nitrobenzene.

The acid filtrate from the original filtration contains a mixture of 1,2-dichloro-3-nitrobenzene and some 1,2-dichloro-4-nitrobenzene. These products may be recovered by allowing the spent acid to stand for a period of time, for example, overnight. On standing, the spent acid separates into an oily layer and an acid layer. The oily layer may be separated by decantation and purified by washing with water a number of times to yield an oil containing the mixed isomers. Alternately, the spent acid filtrate may be further diluted with water to precipitate the eutectic isomer mixture from solution as an oil. The oil is then decanted, washed, and recovered by conventional means.

The following examples will illustrate the novel process of the invention.

EXAMPLE I

To a 2-liter flask equipped with mechanical stirrer and thermometer was charged 1200 grams 98% $H_2SO_4$ and 588 grams 1,2-dichlorobenzene. The mixture was stirred to solution with no exotherm being observed. To the solution over a period of two hours was added dropwise 650 grams 40% mixed acid (a mixture of nitric and sulfuric acids, 40% by weight nitric acid) at a temperature of 25–35° C. External cooling was used to maintain the temperature. The reaction mass was stirred one hour at 30° C. Then, below 50° C., there was dropped into the flask 300 grams water to reduce the sulfuric acid concentration to 80% by weight, excluding the weight of the nitrated product. The mass was allowed to stir overnight at ambient temperature during which time product crystallized from solution.

The reaction mixture was poured into an acid-resistant centrifuge lined with polypropylene cloth, and wrung dry. The cake was washed with 500 grams 80% $H_2SO_4$ and again wrung dry. The cake was then reslurried in 1500 ml. ice water, filtered, and washed acid-free with cold water. The filter cake was then reslurried in 1000 ml. warm water at 60° C., and neutralized to slight alkalinity with 5 ml. ml. of a 20% by weight solution of $Na_2CO_3$ in water. An oil layer was formed, and the mixture was transferred to a separatory funnel. While maintaining the temperature at 50° C., the oil was separated from the aqueous phase. The yield of oil was 532 grams ($th$=768) of pure 1,2-dichloro-4-nitrobenzene having a set-point of 39.6–40.0° C. ($th$=39.8° C.).

The original spent acid filtrate from the centrifuging was allowed to stand overnight, during which time the mass separated into two phases, an oil phase and an aqueous acid phase. The oil layer was separated and washed with water to yield 193 grams of oil. The oil was a eutectic mixture consisting of about 60% by weight 1,2-dichloro-3-nitrobenzene. The mixture had a set-point of 19.1° C.

EXAMPLE II

The method of Example I was repeated with the exceptions that sufficient water was added to the acid reaction mass to dilute the sulfuric acid concentration to the concentration shown in the table below:

TABLE I

| Experiment No. | II-1 | II-2 | II-3 | II-4 | II-5 |
|---|---|---|---|---|---|
| $H_2SO_4$, concentration, percent | 90 | 85 | 75 | 70 | 60 |
| Yield, 1,2-dichloro-4-nitrobenzene, g. | 523.0 | 553.1 | 524.65 | 571.2 | [1] 730.0 |
| Set-point, 1,2-dichloro-4-nitrobenzene, ° C. | 39.95 | 40.02 | 40.00 | 39.95 | 34.0 |
| Yield, eutectic, g. | 202.2 | 178.6 | 204.8 | 150.7 | 30.0 |
| Set-point, eutectic, ° C. | 20.8 | 18.3 | 21.5 | 18.37 | 18.0 |
| Total yield, eutectic +1,2-dichloro-4-nitrobenzene, g. | 726.0 | 731.7 | 729.4 | 721.9 | 760.0 |

[1] The product of Experiment No. II-5 contained globules and was not nearly as crystalline in nature as were the products of the remaining experiments.

From the table, it is seen that when the concentration of sulfuric acid is diluted to 60%, substantially all the reaction products precipitate from solution, whereas at higher concentrations, the 1,2-dichloro-4-nitrobenzene fractionally crystallizes from solution to the exclusion of other products. It has been found that a sulfuric acid concentration of about 65% by weight is as low as desirable in the practice of this invention.

In the above examples, the novel fractional crystallization process of the invention was facilitated by completing the nitration reaction in sulfuric acid having a concentration at which the nitration products, including 1,2-dichloro-4-nitrobenzene, are soluble and thereafter adjusting that concentration to the critical range of the invention whereby the 4-position isomer precipitates to the exclusion of other products. It is also possible to nitrate the 1,2-dichlorobenene in sulfuric acid having a concentration within the critical range whereby 1,2-dichloro-4-nitrobenzene fractionally crystallizes as it is formed.

The foregoing has described the novel process of the invention wherein pure 1,2-dichloro-4-nitrobenzene is prepared by nitrating 1,2-dichlorobenzene dissolved in sulfuric acid, and thereafter receiving the pure product by fractionally crystallizing it from solution by adjusting the sulfuric acid concentration of the nitration mass to a value between about 65 and 90% by weight excluding the weight of the nitrated product.

What is claimed:
1. A process for preparing 1,2-dichloro-4-nitrobenzene from 1,2-dichlorobenzene comprising:
   (a) dissolving said 1,2-dichlorobenzene in 1–3 parts by weight based on 1,2-dichlorobenzene of sulfuric acid having a concentration of at least about 70% by weight,
   (b) adding to the solution at least a stoichiometric quantity of a nitrating acid comprising a mixture of nitric acid and sulfuric acid sufficient to mono-nitrate said 1,2-dichlorobenzene to form 1,2-dichloro-3-nitrobenzene and 1,2-dichloro-4-nitrobenzene,
   (c) adding sufficient water to said solution to adjust the sulfuric acid concentration to about 65–90% by weight excluding the weight of said nitro-dichlorobenzenes whereby said 1,2-dichloro-4-nitrobenzene selectively crystallizes from said solution, and
   (d) recovering said 1,2-dichloro-4-nitrobenzene from said solution.

2. The process of claim 1 wherein said nitrating acid is added to said solution at a temperature of from 15–25° C., and said nitric acid comprises 35–40% by weight of said nitrating acid.

3. The process of claim 1 wherein said recovering is by centrifuging.

4. The process of claim 1 wherein said sulfuric acid concentration is adjusted to 75–85%.

5. A process for separating 1,2-dichloro-4-nitrobenzene from a solution of 1,2-dichloro-3-nitrobenzene and 1,2-dichloro-4-nitrobenzene in sulfuric acid comprising adding sufficient water to said solution to dilute the sulfuric acid concentration to about 65–90% by weight excluding the weight of said dichloro nitrobenzenes, whereby said 1,2- dichloro-4-nitrobenzene fractionally crystallizes from solution to the exclusion of 1,2-dichloro-3-nitrobenzene.

6. A process for the preparation of 1,2-dichloro-4-nitrobenzene from 1,2-dichlorobenzene comprising dissolving said 1,2-dichlorobenzene in sulfuric acid, reacting said dissolved 1,2-dichlorobenzene with at least a stoichiometric quantity of nitric acid based on mono-nitro-1,2-dichlorobenzene, adding sufficient water to said solution to reduce the sulfuric acid concentration to about 65–90% by weight, excluding the weight of the nitrated 1,2-dichlorobenzene whereby 1,2-dichloro-4-nitrobenzene selectively crystallizes from said solution, and recovering said crystallized 1,2-dichloro-4-nitrobenzene.

7. The process of claim 5 wherein said nitration is at 15–25° C., and said nitric acid is added as a solution of nitric acid in sulfuric acid wherein said nitric acid comprises about 30–40% by weight of said solution, the remaining portion being sulfuric acid.

References Cited

UNITED STATES PATENTS

| | | | |
|---|---|---|---|
| 2,883,435 | 4/1959 | Welch | 260—646 |
| 3,272,875 | 9/1966 | Gordon et al. | 260—646 |

LELAND A. SEBASTIAN, Primary Examiner

U.S. Cl. X.R.

260—707